ABSTRACT

United States Patent [19]
Kawakami et al.

[11] 4,422,119
[45] Dec. 20, 1983

[54] LEADER TAPE

[76] Inventors: Yoshio Kawakami; Masatoshi Okamura; Haruo Shiba; Hideki Hotsuki, all of 13-1, Nihonbashi 1-chome, Chuo-ku, Tokyo, Japan

[21] Appl. No.: 285,835

[22] Filed: Jul. 22, 1981

[30] Foreign Application Priority Data

Jul. 28, 1980 [JP] Japan ............................ 55-105688[U]

[51] Int. Cl.³ .............................................. G11B 5/41
[52] U.S. Cl. .................................................... 360/128
[58] Field of Search ................ 360/110, 128, 131, 134

[56] References Cited

U.S. PATENT DOCUMENTS 4,138,229  2/1979  Tadokoro et al. .................. 360/128

FOREIGN PATENT DOCUMENTS

| 52-11207 | 3/1977 | Japan | 360/134 |
| 53-38308 | 4/1978 | Japan | 360/134 |
| 53-114408 | 10/1978 | Japan | 360/134 |
| 53-116113 | 10/1978 | Japan | 360/131 |
| 55-28505 | 2/1980 | Japan | 360/131 |
| 55-28506 | 2/1980 | Japan | 360/131 |
| 1471758 | 4/1977 | United Kingdom | 51/401 |
| 1482410 | 8/1977 | United Kingdom | 360/128 |

Primary Examiner—George G. Stellar
Attorney, Agent, or Firm—Wood, Dalton, Phillips, Mason & Rowe

[57] ABSTRACT

A leader tape for magnetic recording tape, characterized in that a coating film, consisting of a polymeric binder, an inorganic powder having a Mohs' hardness of 5 or above in an amount of not more than 5% by weight on the basis of the binder weight, and an antistatic agent, is formed on a plastic base.

9 Claims, 1 Drawing Figure

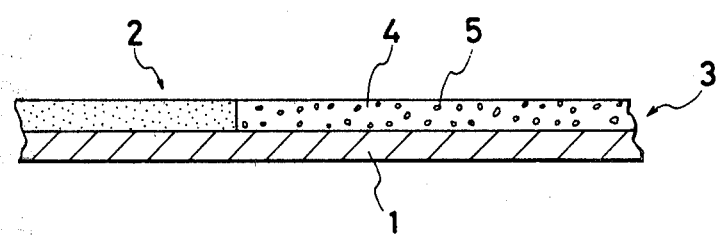

LEADER TAPE

BACKGROUND OF THE INVENTION

This invention relates to a leader tape for splicing to either end or both ends of magnetic recording tape.

Leader tape is in wide use with magnetic recording tape. For this application a plastic tape has been proposed which is coated on one side with a film composition consisting of hard abrasive powder dispersed in binder so as to clean deposits of fine particles of the magnetic film from the magnetic head surface as the tape moves past the head. The cleaning effect generally is limited unless the abrasive content exceeds 10% on the basis of the binder amount. The percentage of the abrasive governs, to some extent, the relative mechanical properties of the leader and magnetic tapes. If it is insufficient, the leader tape will develop unsightly scratches thereon and the friction with the magnetic head will sometimes hinder smooth passage of the tape. Conversely, an excessive abrasive content will lead to early wear of the head. The above-recited 10% is excessive so long as the head wear is concerned and accordingly it is desirable to reduce the amount of the abrasive without adversely affecting the cleaning effect.

Accordingly, a principal object of the present invention is to provide a leader tape for magnetic recording tapes which has on its surface a layer containing a minimized amount of abrasive particles while maintaining a sufficient cleaning effect on a magnetic head, a low friction with the head, and suppression of scratches on the surface of the leader tapes, whereby the wear of the head is minimized.

BRIEF EXPLANATION OF THE DRAWING

The single FIGURE is an enlarged sectional view of a leader tape embodying the invention.

DETAILED EXPLANATION OF THE INVENTION

The present invention can provide a sufficiently useful leader tape by allowing an organic antistatic agent to be present in its coating composition which contains, on the basis of the weight of a polymeric binder (resinous content), only 5% or less by weight, preferably between 0.5 and 4% by weight, of powder of an abrasive (herein defined to be an inorganic substance with a Mohs' hardness of not less than 5) ranging in average particle size desirably from 0.002 to 4$\mu$, more desirably from 0.15 to 0.25$\mu$.

For the present invention any abrasive may be adopted provided it has a Mohs' hardness of 5 or above. For example, $TiO_2$, $SiO_2$, SiC, and $Al_2O_3$ are usable. Such an abrasive having an average particle size in the range of 0.002-4$\mu$ may be employed. A preferred size is in the range of 0.15-0.25$\mu$. If the size is too small, the particles will disturb smooth passage of the magnetic tape, and conversely too large particles will scratch the head.

The antistatic agent to be used with the abrasive may, for example, be the product of Yoshimura Petrochemical Co. marketed under the trade designation of "PM-70", "AW-1", "AW-2", or "PMX-5007". The proportion of the antistatic agent to be contained is in the range of 0.5–10% by weight, preferably in the range of 1–5% by weight. The antistatic agents recited by the trade designations are quaternary ammonium salt type cationic surfactants.

The leader tape according to the invention is well-balanced in properties; it hardly produces abrasion marks or scratches on the magnetic head or is seldom scratched or otherwise damaged by the head. The tape has been found to give such a low electric resistance that it causes no dust deposition or other trouble with an electrical charge. It has also been found to possess improved running quality and achieve an adequate cleaning effect on the magnetic head.

The invention will be described in more detail below with reference to the accompanying drawing. The single FIGURE shows, in section, a base film 1 of polyethylene terephthalate or the like, a magnetic film 2 formed thereon, and an adjacent coating film 3 that provides a leader tape surface on the base. The present invention is characterized by a leader tape consisting of the base film 1 and the coating film 3. Alternatively, the leader tape may be formed independently of the magnetic tape that consists of the base film 1 and the magnetic coating film 2, and subsequently spliced to the both ends of the magnetic tape. The coating film 3 of the leader tape consists essentially of a polymeric binder 4 and a small amount of an inorganic powder having a Mohs' hardness of 5 or more and dispersed in the binder. An organic antistatic agent (not shown) is also mixed in the binder. Examples of the leader tape having the above structure will now be explained.

$TiO_2$ having an average particle size of 0.15–0.25$\mu$ was mixed with a binder, etc. to form the following compositions, on condition that the amount of $TiO_2$ was varied to 0, 1, 2.5, and 5% by weight on the basis of the weight of the resinous contents of the binder.

| | |
|---|---|
| Inorganic pigment ($TiO_2$) | 0–5 parts |
| Binder resins: | |
| Nitrocellulose (H½) | 50 parts |
| Polyurethane (Nippon Polyurethane Ind. Co.'s "N-2304") | 50 parts |
| Solvents: | |
| Toluene plus MEK | 350 parts |
| Antistatic agent (Yoshimura Petochem.'s "PM-70") | 2 parts |

Each mixture was thoroughly mixed up in a ball mill, and, immediately before application, 20 parts of a polyisocyanate (Bayer's "Desmodur") was added as a hardener. The mixture was then applied to a clear polyester tape to form a coating film about 5$\mu$ in thickness. The physical properties of the leader tapes thus obtained were determined. The results are shown in the following table.

TABLE

| $TiO_2$ content (%) | Elec resis ($\Omega/cm^2$) | Scratch on leader tape | Scratch on head | Tape running quality |
|---|---|---|---|---|
| 5 | $7 \times 10^{10}$ | No | Yes | Good |
| 2.5 | " | No | No | " |
| 1 | " | No | No | " |
| 0 | " | No | No | Poor |
| Base alone | $1 \times 10^{16}$ | Yes | No | Good |

As can be seen from the table, the leader tape according to this invention can sastisfactorily attain a cleaning effect with a small abrasive content, thanks to the presence of the antistatic agent. In addition, the leader tape itself is improved in wear resistance, minimizes the wear of the head, and exhibits good running quality.

We claim:

1. A leader tape for magnetic recording tape, which comprises a plastic base film and a coating film thereon, said coating film consisting essentially of a mixture of a polymeric binder, inorganic powder particles having a Mohs' hardness of 5 or above in an amount of not more than 5% by weight on the basis of the binder weight and an antistatic agent.

2. A leader tape according to claim 1. wherein said inorganic powder particles have an average particle size in the range of $0.002-4\mu$.

3. A leader tape according to claim 2, wherein said inorganic powder particles have an average size in the range of $0.15-0.25\mu$.

4. A leader tape according to claim 1, 2 or 3, wherein said inorganic powder particles are in an amount of 0.5-4% by weight on the basis of the binder weight.

5. A leader tape according to claim 1, 2 or 3, wherein said antistatic agent is in the range of 0.5-10% by weight on the basis of the binder weight.

6. A leader tape according to claim 4 where said antistatic agent is in the range of 0.5-10% by weight on the basis of the binder weight.

7. A leader tape according to claim 5 wherein said antistatic agent is in the range of 1-5% by weight on the basis of the binder weight.

8. A leader tape according to claim 1, 2 or 3 wherein said antistatic agent is selected from the group consisting of quaternary ammonium salt-type cationic surfactants.

9. A leader tape according to claim 6 wherein said antistatic agent is in the range of 1-5% by weight on the basis of the binder weight.